US011953711B2

(12) United States Patent
Park et al.

(10) Patent No.: US 11,953,711 B2
(45) Date of Patent: Apr. 9, 2024

(54) DIFFRACTIVE LIGHT GUIDE PLATE AND DISPLAY DEVICE INCLUDING SAME

(71) Applicant: LG CHEM, LTD., Seoul (KR)

(72) Inventors: Jeong Ho Park, Daejeon (KR); Seong Min Park, Daejeon (KR); Sang Choll Han, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 384 days.

(21) Appl. No.: 17/299,281

(22) PCT Filed: Feb. 24, 2020

(86) PCT No.: PCT/KR2020/002591
§ 371 (c)(1),
(2) Date: Jun. 2, 2021

(87) PCT Pub. No.: WO2020/171666
PCT Pub. Date: Aug. 27, 2020

(65) Prior Publication Data
US 2022/0026619 A1 Jan. 27, 2022

(30) Foreign Application Priority Data

Feb. 22, 2019 (KR) .................. 10-2019-0021188
Feb. 21, 2020 (KR) .................. 10-2020-0021640

(51) Int. Cl.
G02B 5/18 (2006.01)
F21V 8/00 (2006.01)
G02B 27/42 (2006.01)

(52) U.S. Cl.
CPC ......... *G02B 6/0016* (2013.01); *G02B 5/1819* (2013.01); *G02B 6/0038* (2013.01); *G02B 27/4205* (2013.01)

(58) Field of Classification Search
CPC .................................................. G02B 5/1819
See application file for complete search history.

(56) References Cited

U.S. PATENT DOCUMENTS 6,580,529 B1 * 6/2003 Amitai ............... G02B 27/0944
359/13
8,233,204 B1 * 7/2012 Robbins ................. G02B 27/01
359/566

(Continued)

FOREIGN PATENT DOCUMENTS

CN 106575034 A 4/2017
JP 2018-512562 A 5/2018

(Continued)

OTHER PUBLICATIONS

WO 2018014467 A1 English translation (Year: 2018).*

*Primary Examiner* — Charlie Y Peng
(74) *Attorney, Agent, or Firm* — Bryan Cave Leighton Paisner LLP

(57) ABSTRACT

A diffractive light guide plate including a light guide unit; an input diffractive optical element that receives lights output from a light source and diffracts the received lights to be guided on the light guide unit; and two output diffractive optical elements disposed in a predetermined region of the light guide unit and having different linear grating patterns from each other, wherein the two output diffractive optical elements are configured so that each one output diffractive optical element receives the lights from the input diffractive optical element and allows the received lights to be directed to the other output diffractive optical element by diffraction, and so that each one output diffractive optical element receives lights from the other output diffractive optical element and allows the received lights to be output from the light guide unit by diffraction, and the two output diffractive optical elements having different linear grating patterns are (Continued)

alternately arranged in at least one dimension in a central region having at least a predetermined width within the predetermined region and partitioned longitudinally from a side adjacent to the input diffractive optical element to an opposite side thereto.

9 Claims, 14 Drawing Sheets

(56) References Cited

U.S. PATENT DOCUMENTS

| | | |
|---|---|---|
| 9,341,846 B2 | 5/2016 | Popovich et al. |
| 9,400,395 B2 | 7/2016 | Travers et al. |
| 10,114,220 B2 | 10/2018 | Grey et al. |
| 2015/0277014 A1 | 10/2015 | Schrader |
| 2017/0168232 A1 | 6/2017 | Tearney et al. |
| 2017/0179680 A1 | 6/2017 | Mahgerefteh et al. |
| 2017/0315346 A1* | 11/2017 | Tervo .................. G02B 5/1819 |
| 2018/0081176 A1* | 3/2018 | Olkkonen .......... G02B 27/0172 |
| 2019/0004321 A1 | 1/2019 | Grey et al. |

FOREIGN PATENT DOCUMENTS

| | | |
|---|---|---|
| KR | 10-2016-0113195 A | 9/2016 |
| KR | 10-2017-0039655 A | 4/2017 |
| WO | 2014/091200 A1 | 6/2014 |
| WO | WO-2018014467 A1 * | 1/2018 |
| WO | 2018/220266 A1 | 12/2018 |
| WO | 2018231754 A1 | 12/2018 |

\* cited by examiner

130

140

(a)

(b)

(a)

(b)

DIFFRACTIVE LIGHT GUIDE PLATE AND DISPLAY DEVICE INCLUDING SAME

CROSS-REFERENCE TO RELATED APPLICATIONS

This application is a National Stage Application of International Application No. PCT/KR2020/002591 filed on Feb. 24, 2020, which claims priority to and benefit of Korean Patent Application No. 10-2019-0021188 filed on Feb. 22, 2019 and Korean Patent Application No. 10-2020-0021640 filed on Feb. 21, 2020, disclosures of which are incorporated by reference in their entirety for all purposes as if fully set forth herein.

TECHNICAL FIELD

The present disclosure relates to a diffractive light guide plate and a display device including the same.

BACKGROUND

Recently, with an increase in interest in a display unit that implements augmented reality (AR), mixed reality (MR), or virtual reality (VR), research into the display unit that implements them has been actively conducted. The display unit for implementing the augmented reality, the mixed reality, or the virtual reality includes a diffractive light guide plate using a diffractive phenomenon based on the wave properties of light.

FIG. 1 is a view schematically illustrating a diffractive light guide plate 10 according to the related art.

Such a diffractive light guide plate 10 may include a light guide unit 11 and a plurality of diffractive optical elements 12 to 14 provided on one side or the other side of the light guide unit 11 and having a plurality of linear grating patterns. Specifically, the diffractive light guide plate 10 may include the input diffractive optical element 12, the intermediate diffractive optical element 13, and the output diffractive optical element 14. The input diffractive optical element 12 receives a light output through a micro light source output element P and allows the light to be guided on the light guide unit 11. The intermediate diffractive optical element 13 is optically coupled to the input diffractive optical element 12 through the light guide unit 11 and allows the light received from the input diffractive optical element 12 to be one-dimensionally extended in a first direction (an x-axis direction in FIG. 1) by diffraction. The output diffractive optical element 14 is optically coupled to the intermediate diffractive optical element 13 through the light guide unit 11 and allows the light received from the intermediate diffractive optical element 13 to be one-dimensionally extended in a second direction (a y-axis direction in FIG. 1) by diffraction such that the light is output from the light guide unit 11 toward a user's pupil.

Since the main optical path of the light output through the micro light source output element P to the user's pupil is in the order of the input diffractive optical element 12, the intermediate diffractive optical element 13, the output diffractive optical element 14, and the user's pupil, the size of an optical image output from the light guide unit 11 through the output diffractive optical element 14 depends on an area occupied by the output diffractive optical element 14.

However, in the case of the diffractive light guide plate according to the related art, since the single input diffractive optical element 12, the single intermediate diffractive optical element 13, and the single output diffractive optical element 14 are disposed separately from one another on the light guide unit 11, the area occupied by the output diffractive optical element 14 on the light guide unit 11 is inevitably limited to an area excluding an area occupied by the input diffractive optical element 12 and the intermediate diffractive optical element 13 on the light guide unit 11, resulting in a limitation in outputting a larger optical image and a limitation in a visible region due to the position deviation of the user's pupil.

In order to solve such limitations, a diffractive light guide plate having a structure illustrated in FIG. 2 may be considered.

FIG. 2 illustrates the diffractive light guide plate including a light guide unit 21, an input diffractive optical element 22, and two diffractive optical elements 23 and 24 having different linear grating patterns from each other and coming into contact with each other.

FIG. 3a is a plan view schematically illustrating an example of an optical path through the diffractive light guide plate illustrated in FIG. 2, and FIG. 3b is a plan view schematically illustrating another example of an optical path through the diffractive light guide plate illustrated in FIG. 2.

The light guide unit 21 guides lights in an interior by using total internal reflection.

The input diffractive optical element 22 may receive lights L1, L1a, and L1b output from a light source and diffract the received lights L1, L1a, and L1b to be guided on the light guide unit 21.

The two diffractive optical elements 23 and 24 may be configured to receive diffracted lights L2a and L2b and allow the received lights to be extended in one dimension by diffraction. A part of the diffracted lights L2a and L2b received from the input diffractive optical element 22 may be diffracted by passing through the diffractive optical elements 23 and 24 and thus have an optical path changed, and the rest thereof may be totally reflected to an existing optical path. The light initially received from the input diffractive optical element 22 may be divided into a plurality of beams L3a and L3b while being diffracted a plurality of times at a point spaced in a specific direction, and eventually extended in one dimension.

The diffractive optical element 23 may be configured to receive the extended light L3b from the other diffractive optical element 24 and allow the received light L3b to be output from the light guide unit 21 by diffraction, and the diffractive optical element 24 may be configured to receive the extended light L3a from the other diffractive optical element 23 and allow the received light L3a to be output from the light guide unit 21 by diffraction. Furthermore, the diffractive optical element may receive the extended light L3b from the other diffractive optical element 24 and extend the received light in one dimension by diffraction, and the diffractive optical element 24 may receive the extended light L3a from the other diffractive optical element 23 and extend the received light in one dimension by diffraction. In such a case, the direction, in which the plurality of beams L3b and L3a formed by the lights extended by the diffractive optical elements 24 and 23 are spaced apart from each other based on a light receiving side C of each of the two diffractive optical elements 23 and 24, intersects the direction in which a plurality of beams L4b and L4a extended by the two diffractive optical elements 23 and 24 are spaced apart from each other based on the single beams L3b and L3a, so that two-dimensional extension is achieved based on the lights L1a and L1b received by the input diffractive optical element 22 from the light source.

The diffractive optical element 23 may be configured such that the light receiving side C receiving the extended light L3b from the other diffractive optical element 24 is in contact with the light receiving side C of the diffractive optical element 24, and the diffractive optical element 24 may be configured such that the light receiving side C receiving the extended light L3a from the other diffractive optical element 23 is in contact with the light receiving side C of the diffractive optical element 23. The lights output from the light source is output from the light guide unit 21 via the input diffractive optical element 22, the two diffractive optical elements 23 and 24, and the other diffractive optical elements 24 and 23, and thus the lights output from the light guide unit 21 may be collected by the other diffractive optical elements 24 and 23, respectively, to form one image light.

That is, the two diffractive optical elements 23 and 24 are all used as output diffractive optical elements, so that it is possible to form an image light having a larger viewing angle while efficiently using a space, as compared with the case of using the single output diffractive optical element as illustrated in FIG. 1.

FIG. 4 is a sectional view of the diffractive light guide plate taken along line III-III', which is illustrated in FIG. 3a and/or illustrated in FIG. 3b.

The lights diffracted through the two diffractive optical elements 23 and 24 and output from the light guide unit 21 may be output at predetermined exit angles θ and θ' with respect to one surface of the light guide unit 21, respectively. In FIG. 4, the light L4a diffracted and output by the diffractive optical element 23 located on an upper side may be output inclined downward at the predetermined exit angle θ with respect to one surface of the light guide unit 21, and the light L4b diffracted and output by the diffractive optical element 24 located on a lower side may be output inclined upward at the predetermined exit angle θ' with respect to one surface of the light guide unit 21.

At a position spaced apart from one surface of the light guide unit 21 by a predetermined distance, the light L4a diffracted and output by the diffractive optical element 23 located on the upper side and the light L4b diffracted and output by the diffractive optical element 24 located on the lower side form intersection regions I intersecting each other. In a case where a distance spaced apart from one surface of the light guide unit 21 is a distance corresponding to an eye relief where the user's pupil is located, only when the user's pupil is located in the intersection region I, the user can visually recognize a normal image light without a dark part of the entire area. When the user's pupil is located in a region A located above the intersection region I, since the light L4b diffracted and output by the diffractive optical element 24 located on the lower side is not visually recognizable by the user, a lower portion of the image light visually recognized by the user may appear dark on the basis of the cross-section of the line III-III'. On the other hand, when the user's pupil is located in a region B located below the intersection region I, since the light L4a diffracted and output by the diffractive optical element 23 located on the upper side is not visually recognizable by the user, an upper portion of the image light visually recognized by the user may appear dark on the basis of the cross-section of the line III-III'.

Pupils of users using a display unit including the diffractive light guide plate may be variously located on the basis of the vertical direction on one side of the light guide unit by individual physical characteristics of the users. Therefore, it is necessary to provide a structure of a diffractive light guide plate in which an intersection region I related to an eye motion box, where a normal image light can be visually recognized, can be formed to elongate vertically.

Since the related art described above is technical information possessed by the inventor for deriving embodiments of the present disclosure or acquired in the derivation process of the present disclosure, it may not be necessarily said to be a publicly known technique disclosed to the general public before filing the application for the present disclosure.

DISCLOSURE

Technical Problem

Accordingly, the present disclosure provides a diffractive light guide plate capable of forming a large viewing angle and eye motion box and a display device including the same.

Problems to be solved by the present disclosure are not limited to the aforementioned problems, and the other unmentioned problems will be clearly understood by those skilled in the art from the following description.

Technical Solution

An embodiment according to an aspect of the present disclosure includes a light guide unit configured to guide lights; an input diffractive optical element configured to receive lights output from a light source and diffract the received lights to be guided on the light guide unit; and two output diffractive optical elements disposed in a predetermined region of the light guide unit and having different linear grating patterns from each other, wherein the two output diffractive optical elements are configured so that each one output diffractive optical element receives the lights from the input diffractive optical element and allows the received lights to be directed to the other output diffractive optical element by diffraction, the two output diffractive optical elements are configured so that each one output diffractive optical element receives lights from the other output diffractive optical element and allows the received lights to be output from the light guide unit by diffraction, the two output diffractive optical elements are in contact with each other without forming regions overlapping each other on the light guide unit, and the two output diffractive optical elements having different linear grating patterns from each other are alternately arranged in at least one dimension in a central region having at least a predetermined width within the predetermined region and partitioned longitudinally from a side adjacent to the input diffractive optical element to an opposite side thereto.

In the present embodiment, preferably, the two output diffractive optical elements are alternately arranged in two dimensions in the central region.

In the present embodiment, preferably, the two output diffractive optical elements are alternately arranged in two dimensions all over the predetermined region.

In the present embodiment, preferably, each of the two output diffractive optical elements has a width of 4 mm or less in the region where the two output diffractive optical elements are alternately arranged.

In the present embodiment, preferably, each of the two output diffractive optical elements has a length of 4 mm or less in the region where the two output diffractive optical elements are alternately arranged.

In the present embodiment, each of the diffractive optical elements may include linear gratings repeatedly formed at predetermined pitches and have a grating vector defined by a size inversely proportional to the pitches of the linear gratings and a direction perpendicular to a direction in which the linear gratings are extended, and a sum of the grating vectors of the input diffractive optical element and the two output diffractive optical elements may have a value of 0.

In the present embodiment, the grating vectors of each of the input diffractive optical element and the two output diffractive optical elements may have the same size.

In the present embodiment, the grating vectors of each of the input diffractive optical element and the two output diffractive optical elements may form an angle of 60° therebetween.

In the present embodiment, the two output diffractive optical elements may be provided on the same plane on the light guide unit.

An embodiment according to an aspect of the present disclosure provides a display device including: a light source configured to output an image light that forms an image; and the diffractive light guide plate according to the embodiment of an aspect of the present disclosure.

Advantageous Effects

In accordance with the embodiments of the present disclosure, an extended image light is output from the light guide unit by each of the two output diffractive optical elements, so that it is advantageous in that it is possible to form an image light having a larger viewing angle as compared with the case of outputting the image light from the light guide unit by using only a single diffractive optical element.

Furthermore, since the two output diffractive optical elements having different linear grating patterns from each other are alternately arranged in at least one dimension in the central region having at least a predetermined width within the predetermined region and partitioned longitudinally from the side adjacent to the input diffractive optical element to the opposite side thereto, it is possible to form a long eye motion box at a position spaced apart from one surface of the light guide unit by the eye relief, so that it is advantageous in that it is possible to provide a display device capable of widely coping with pupils of users with various physical conditions by using the diffractive light guide plate according to an embodiment of the present disclosure.

MODE FOR DISCLOSURE

Figure 1:
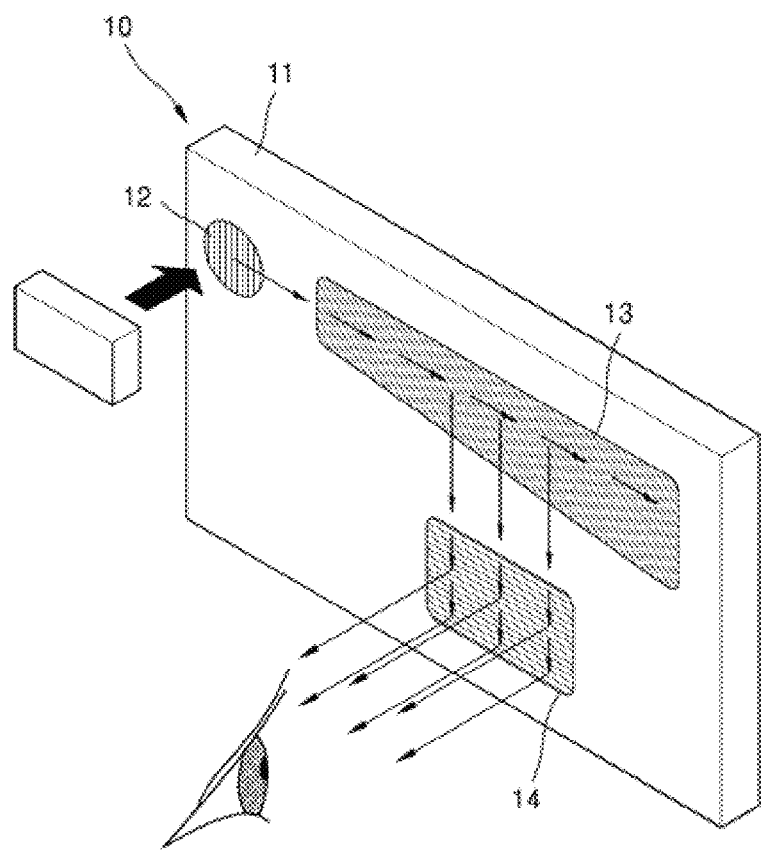
FIG. 1 is a view schematically illustrating a diffractive light guide plate according to the related art.
Figure 2:
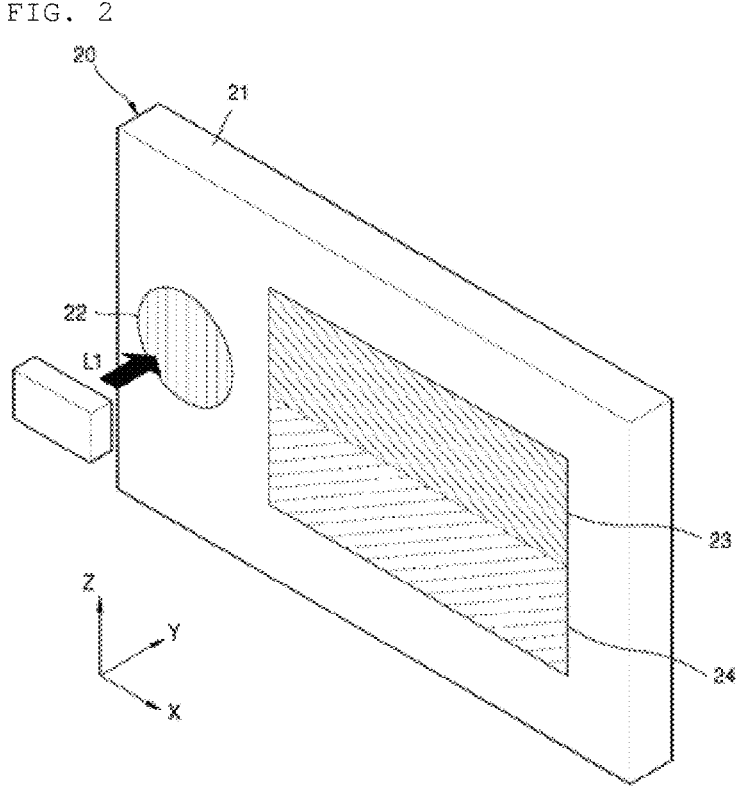
FIG. 2 illustrates a diffractive light guide plate including a light guide unit, an input diffractive optical element, and two diffractive optical elements having different linear grating patterns from each other and coming into contact with each other.
Figure 3A:
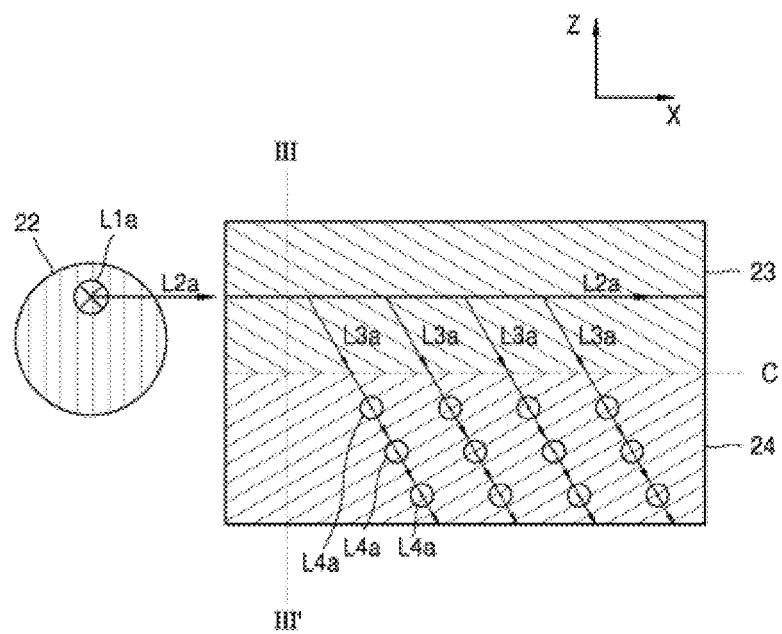
FIG. 3a is a plan view schematically illustrating an example of an optical path through the diffractive light guide plate illustrated in FIG. 2.
Figure 3B:
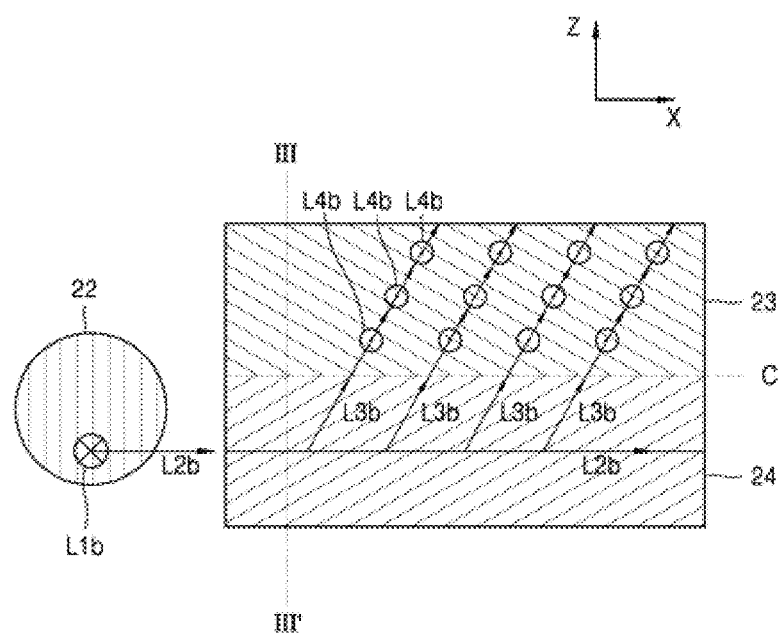
FIG. 3b is a plan view schematically illustrating another example of an optical path through the diffractive light guide plate illustrated in FIG. 2.
Figure 4:
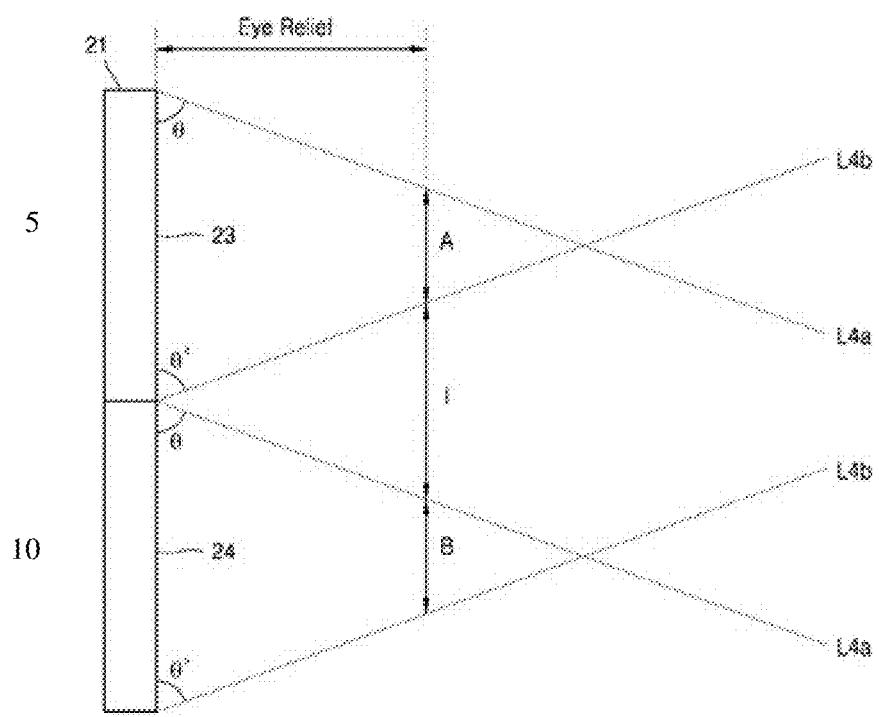
FIG. 4 is a sectional view of the diffractive light guide plate taken along line III-III', which is illustrated in FIG. 3a and/or illustrated in FIG. 3b.

The present disclosure will become apparent by reference to the following detailed description in conjunction with the accompanying drawings. However, the scope of the present disclosure is not limited to such embodiments and the present disclosure may be realized in various forms. The embodiments to be described below are nothing but the ones provided to bring the disclosure of the present disclosure to perfection and assist those skilled in the art to completely understand the scope of the present disclosure in the technical field to which the present disclosure pertains. The present disclosure is defined only by the scope of the appended claims. The terminology used herein is for the purpose of describing embodiments only and is not intended to limit the present disclosure. As used herein, the singular forms "a", "an" and "the" are intended to include the plural forms as well, unless the context clearly indicates otherwise. The terms "comprises" and/or "comprising" of stated component, step, operation and/or element, when used herein, do not exclude the presence or addition of one or more other components, steps, operations, and/or elements. The terms such as first and second may be used to describe various components, but the components are not limited by the terms. The terms are used only to distinguish one component from another component.

In the present specification, the term "light guide unit" may be defined as a structure for guiding lights in an interior by using total internal reflection. The condition for the total internal reflection is that the refractive index of the light guide unit needs to be larger than that of a surrounding medium adjacent to the surface of the light guide unit. The light guide unit may be formed of a glass and/or plastic material and may be transparent or translucent. The light guide unit may be formed in various layouts in a plate type. The term "plate" means a three-dimensional structure having a predetermined thickness between one surface and the other surface on the opposite side thereto, and the one surface and the other surface may be substantially flat planes, but at least one of the one surface and the other surface may be formed to be curved in one dimension or two dimensions. For example, the plate-type light guide unit may be curved in one dimension, so that one surface and/or the other surface thereof may have a shape corresponding to some of side surfaces of a cylinder. However, preferably, a curvature formed by its curving has a radius of curvature large enough to facilitate total internal reflection in order to guide lights on the light guide unit.

In the present specification, the term "diffractive optical element" may be defined as a structure for changing an optical path by diffracting lights on the light guide unit. The "diffractive optical element" may indicate a part in which linear gratings aligned in one direction on the light guide unit are arranged in a predetermined direction to form a predetermined area while having a pattern.

In the present specification, the term "linear grating" may indicate a protrusion shape (that is, an embossed pattern) having a predetermined height on the surface of the light guide unit and/or a groove shape (that is, an intaglio pattern) having a predetermined depth in the surface of the light guide unit. The alignment direction of the linear gratings may be freely designed such that the optical path can be changed in an intended direction through diffraction by the diffractive optical element.

Figure 5:
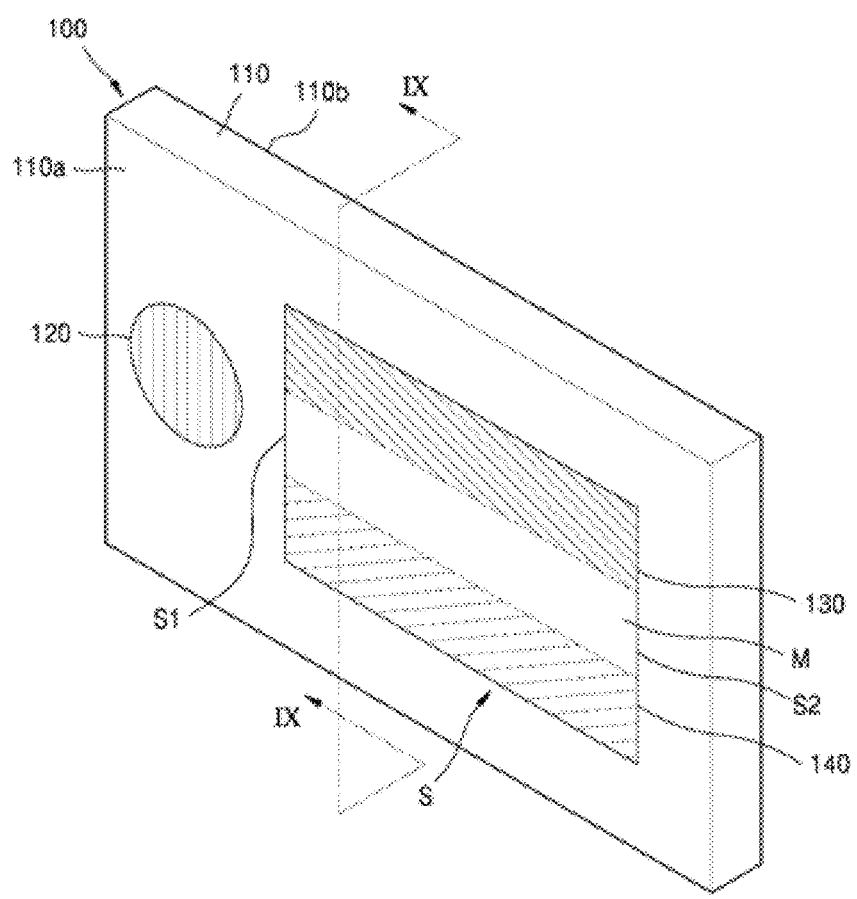
FIG. 5 is a view schematically illustrating a diffractive light guide plate according to an aspect of the present disclosure.
Figure 6A:
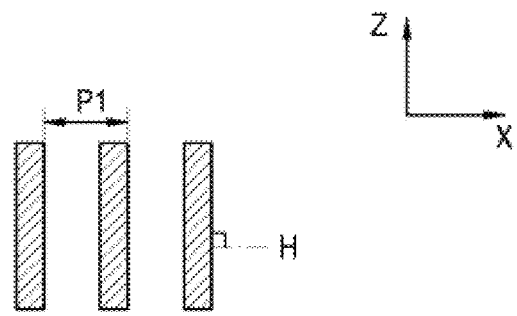
FIG. 6a to 6c are plan views of gratings included in various diffractive optical elements of the diffractive light guide plate according to an aspect of the present disclosure.
Figure 6B:
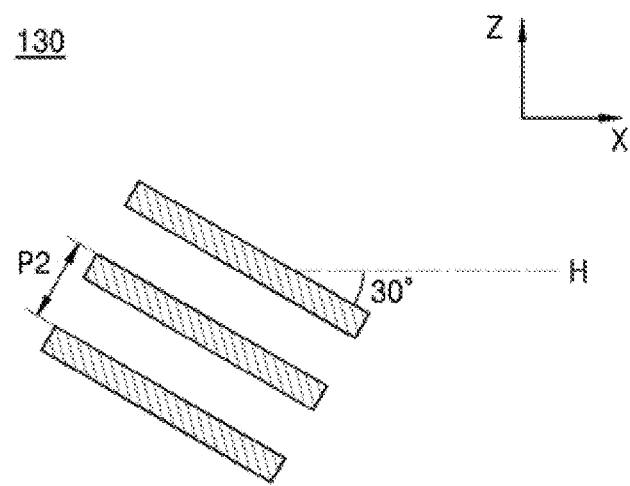
Figure 6C:
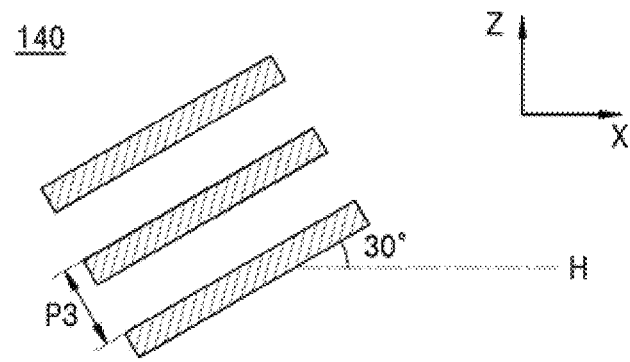
Figure 7:
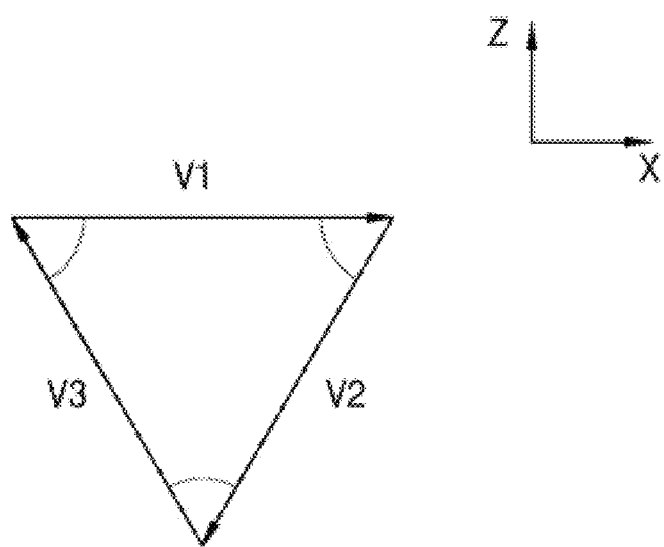
FIG. 7 is a view illustrating a combination of grating vectors included in the various diffractive optical elements of the diffractive light guide plate according to an aspect of the present disclosure.

FIG. 5 is a view schematically illustrating a diffractive light guide plate according to an aspect of the present disclosure, FIG. 6a to 6c are plan views of gratings included in various diffractive optical elements of the diffractive light guide plate according to an aspect of the present disclosure, and FIG. 7 is a view illustrating a combination of grating vectors included in the various diffractive optical elements of the diffractive light guide plate according to an aspect of the present disclosure.

Figure 8A:
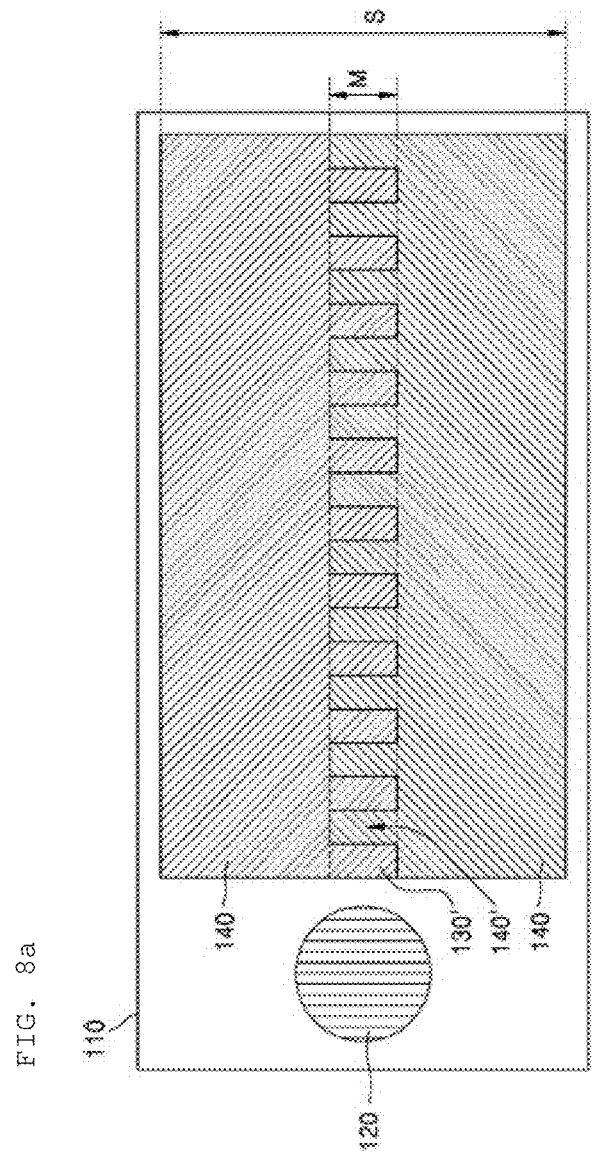
FIG. 8a to 8c are plan views of diffractive light guide plates of various embodiments according to an aspect of the present disclosure.
Figure 8B:
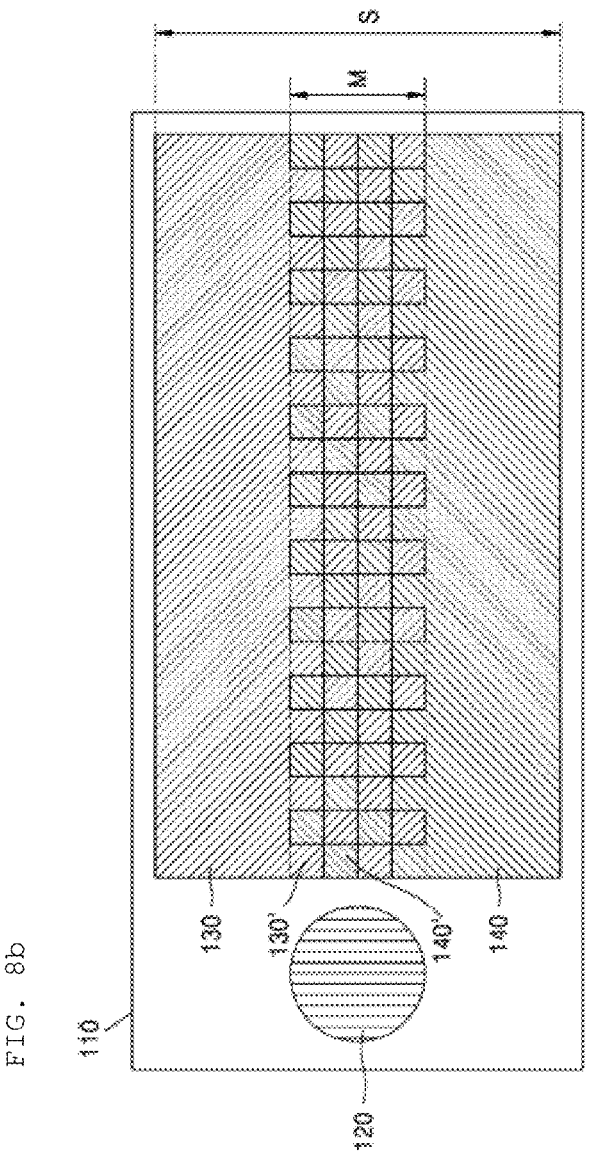
Figure 8C:
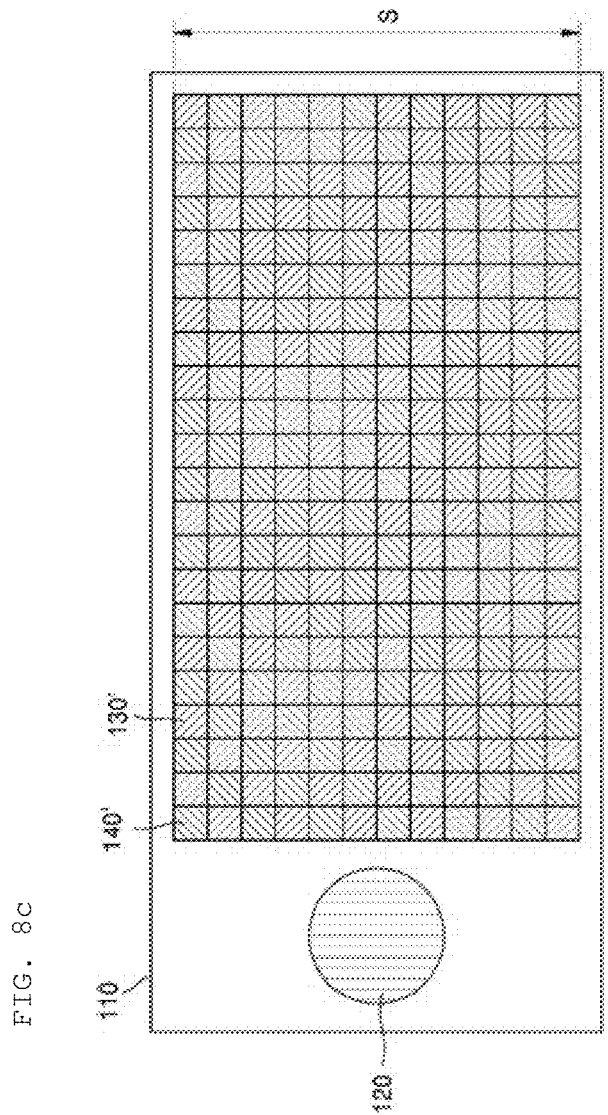
Figure 9:
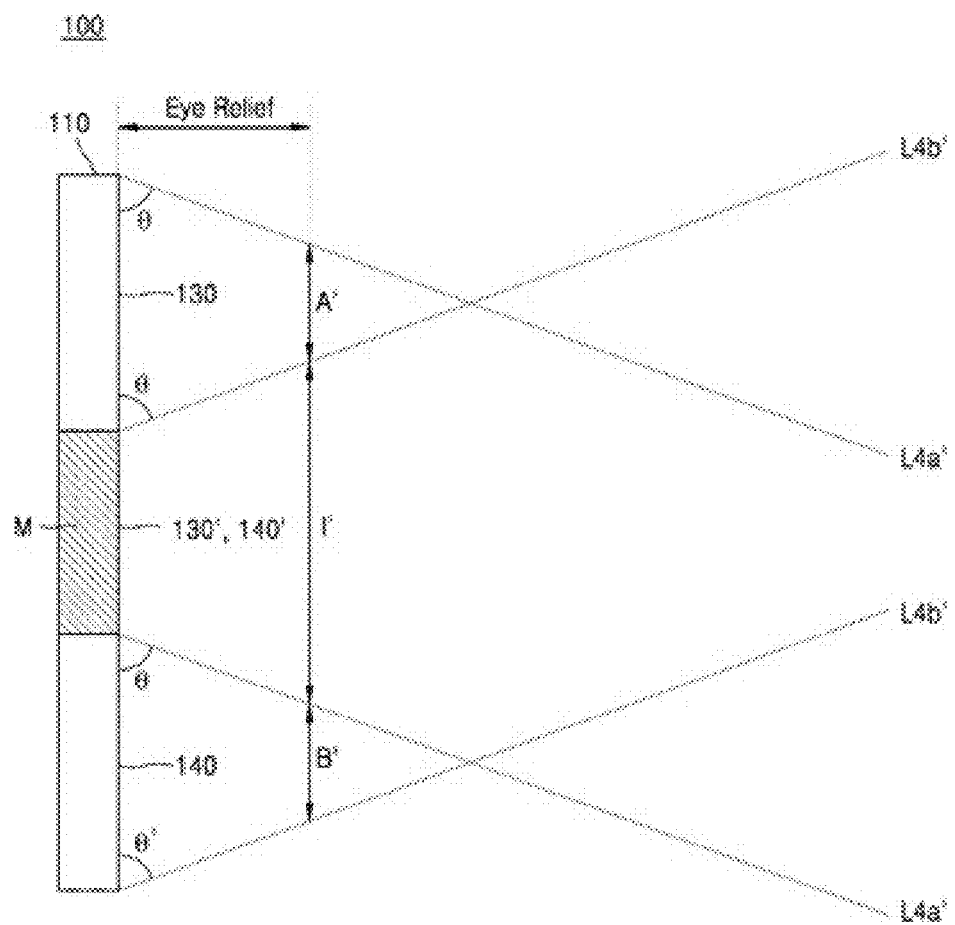
FIG. 9 is a sectional view of the diffractive light guide plate illustrated in FIG. 5 taken along line IV-IV'.

FIG. 8a to 8c are plan views of diffractive light guide plates of various embodiments according to an aspect of the present disclosure, and FIG. 9 is a sectional view of the diffractive light guide plate illustrated in FIG. 5 taken along line IV-IV'.

Referring to FIG. 5 to FIG. 9, a diffractive light guide plate 100 may include a light guide unit 110, an input diffractive optical element 120, and two output diffractive optical elements 130 and 140.

The light guide unit 110 may guide lights in an interior by using total internal reflection.

The input diffractive optical element 120 may receive lights output from a light source and diffract the received lights to be guided on the light guide unit 110.

Such an input diffractive optical element 120 may be disposed on one surface 110a (for example, the left side of FIG. 5) of the light guide unit 110.

The two output diffractive optical elements 130 and 140 may be disposed in a predetermined region S on the one surface 110a or the other surface 110b of the light guide unit 110.

The two output diffractive optical elements 130 and 140 include different linear grating patterns from each other.

The output diffractive optical element 130 may be configured to receive the lights from the input diffractive optical element 120 and to allow the received lights to be directed to the other output diffractive optical element 140 by diffraction, and the output diffractive optical element 140 may be configured to receive the lights from the input diffractive optical element 120 and to allow the received lights to be directed to the other output diffractive optical element 130 by diffraction. Furthermore, each of the two output diffractive optical elements 130 and 140 may be configured to receive diffracted lights from the input diffractive optical element 120 and extend the received light in one dimension by diffraction. A part of the diffracted lights received from the input diffractive optical element 120 may be diffracted by passing through the diffractive optical elements 130 and 140 and thus have an optical path changed, and the rest may be totally reflected to an existing optical path. The light initially received from the input diffractive optical element 120 may be divided into a plurality of beams while being diffracted a plurality of times at a point spaced in a specific direction, and eventually extended in one dimension.

The output diffractive optical element 130 may be configured to receive the extended light from the other output diffractive optical element 140 and allow the received light to be output from the light guide unit 110 by diffraction, and the output diffractive optical element 140 may be configured to receive the extended light from the other output diffractive optical element 130 and allow the received light to be output from the light guide unit 110 by diffraction. Furthermore, the output diffractive optical element 130 may receive the extended light from the other output diffractive optical element 140 and extend the received light in one dimension by diffraction, and the output diffractive optical element 140 may receive the extended light from the other output diffractive optical element 130 and extend the received light in one dimension by diffraction. In such a case, the direction, in which the plurality of beams formed by the lights received from the input diffractive optical element 120 and extended by the two output diffractive optical elements 130 and 140 are spaced apart from each other, intersects the direction in which a plurality of beams received from the other output diffractive optical elements 140 and 130 and extended by the two output diffractive optical elements 130 and 140 are spaced apart from each other, so that the lights output by the plurality of beams extended by the output diffractive optical elements 130 and 140 may be treated as being two-dimensionally extended based on the lights received by the input diffractive optical element 120 from the light source.

The two output diffractive optical elements 130 and 140 may be formed to partially overlap each other on the light guide unit 110 due to a design error and the like of a manufacturing process.

However, preferably, the two output diffractive optical elements 130 and 140 do not form regions overlapping each other on the light guide unit 110. In the case of a light that is totally reflected by diffraction on one output diffractive optical element and travels toward the other output diffractive optical element, whenever the light encounters spaced linear grating patterns on the diffractive optical element, the light may not travel along an intended total reflection path and its optical path may be distorted little by little. Therefore, the two output diffractive optical elements 130 and 140 are caused to be prevented from overlapping the other output diffractive optical elements 140 and 130 in a distinct region based on the plan view of the light guide unit 110, so that it is possible to prevent one output diffractive optical element from excessively overlapping a region occupied by the other output diffractive optical element, thereby preventing an actual optical path from being excessively distorted from the intended total reflection path.

Preferably, the two output diffractive optical elements 130 and 140 are in contact with the other output diffractive optical elements 140 and 130, respectively. The lights output from the light source are output from the light guide unit 110 via the input diffractive optical element 120, the two output diffractive optical elements 130 and 140, and the other output diffractive optical elements 140 and 130, and the lights output from the light guide unit 110, that is, the lights output by the other output diffractive optical elements 140 and 130 are collected to form one image light. Therefore, it is necessary for each of the two output diffractive optical elements 130 and 140 to be in contact with the other output diffractive optical elements 140 and 130 so that output image lights are not divided.

In a predetermined region S where the two output diffractive optical elements 130 and 140 are disposed, a central region M having at least a predetermined width (width in the vertical direction of FIG. 5) and partitioned longitudinally from a side S1, which is adjacent to the input diffractive optical element 120, to an opposite side S2 may be defined. In such a central region M, two output diffractive optical elements 130' and 140' having different linear grating patterns from each other may be alternately arranged in at least one dimension. The one-dimensional alternate arrangement means that the two output diffractive optical elements 130' and 140' are alternately arranged along the longitudinal direction of the central region M (left and right direction of FIG. 5).

For example, as illustrated in FIG. 8a, the output diffractive optical element 130' having the same linear grating pattern as that of the output diffractive optical element 130 disposed on an upper side of the predetermined region S may be first arranged on the side S1 adjacent to the input diffractive optical element 120 in the central region M, the output diffractive optical element 140' having the same linear grating pattern as that of the output diffractive optical element 140 disposed on a lower side of the predetermined region S may be arranged next to the output diffractive optical element 130', and then the different output diffractive optical elements 130' and 140' may be sequentially and alternately arranged.

The two output diffractive optical elements 130' and 140' having different linear grating patterns from each other may be alternately arranged in two dimensions in the central region. The two-dimensional alternate arrangement means that the two output diffractive optical elements 130' and 140' are alternately arranged along the width direction of the central region M (vertical direction of FIG. 5) as well as the longitudinal direction of the central region M (left and right direction of FIG. 5). That is, the two output diffractive optical elements 130' and 140' may be arranged in a matrix form.

For example, as illustrated in FIG. 8b, in the central region M, the output diffractive optical element 130' having the same linear grating pattern as that of the output diffractive optical element 130 disposed on the upper side of the predetermined region S and the output diffractive optical element 140' having the same linear grating pattern as that of the output diffractive optical element 140 disposed on the lower side of the predetermined region S may be alternately arranged in two dimensions in a matrix form of m×n. Here, m and n are positive integers and may be selected as various values according to the size of the light guide plate.

The two output diffractive optical elements 130' and 140' having different linear grating patterns from each other may be alternately arranged in two dimensions in the entire predetermined region S. The two-dimensional alternate arrangement means that the two output diffractive optical elements 130' and 140' are alternately arranged along the width direction of the predetermined region S (vertical direction of FIG. 5) as well as the longitudinal direction of the predetermined region S (left and right direction of FIG. 5). That is, the two output diffractive optical elements 130' and 140' may be arranged in a matrix form.

For example, as illustrated in FIG. 8c, in the predetermined region S, the two output diffractive optical elements 130' and 140' having different linear grating patterns from each other may be alternately arranged in two dimensions in a matrix form of 12×22.

Meanwhile, the two output diffractive optical elements 130' and 140' having different linear grating patterns from each other may be formed to partially overlap each other on the light guide unit 110 due to a design error and the like of the manufacturing process. However, as described above, in order to prevent the actual optical path from being excessively distorted from the intended total reflection path, it is preferable that the two output diffractive optical elements 130' and 140' do not form regions overlapping each other on the light guide unit 110. In addition, as described above, it is preferable that each of the two output diffractive optical elements 130' and 140' is in contact with the other output diffractive optical elements 140 and 130 so that output image lights are not divided.

The width and/or length of each of the two output diffractive optical elements 130' and 140' in the region where the two output diffractive optical elements 130' and 140' are alternately arranged are preferably 4 mm or less, and more preferably, 2 mm or less.

This is for preventing each light, which is diffracted through the two different output diffractive optical elements 130' and 140' adjacently and alternately arranged and output from the light guide unit 110, from being separated and visually recognized because the size of a human pupil is generally about 2 mm on average during the daytime and about 4 mm on average at night.

Although FIG. 8a to FIG. 8c illustrate that the different output diffractive optical elements 130' and 140' have the same width and/or length, the present disclosure is not limited thereto and the size of each of the different output diffractive optical elements 130' and 140' alternately arranged may be arbitrarily changed.

Referring to FIG. 9, in the diffractive light guide plate 100 according to an aspect of the present disclosure, the lights diffracted through the two output diffractive optical elements 130 and 140 and output from the light guide unit 110 may be output at predetermined exit angles θ and θ' with respect to one surface of the light guide unit 110, respectively. In FIG. 9, light L4a' diffracted and output by the output diffractive optical element 130 located on an upper side may be output inclined downward at the predetermined exit angle θ with respect to one surface of the light guide unit 110, and light L4b' diffracted and output by the output diffractive optical element 140 located on a lower side may be output inclined upward at the predetermined exit angle θ' with respect to one surface of the light guide unit 110.

In the central region M of the light guide unit 110, since the two output diffractive optical elements 130' and 140' are alternately arranged and mixed in at least one dimension, the light L4a' diffracted and output by the output diffractive optical element 130' having the same linear grating pattern as that of the output diffractive optical element 130 disposed on the upper side and the light L4b' diffracted and output by the output diffractive optical element 140' having the same linear grating pattern as that of the output diffractive optical element 140 disposed on the lower side may be mixed in the central region M.

Thus, the region, which is occupied by the light L4a' that is diffracted by the output diffractive optical element 130 disposed on the upper side and the output diffractive optical element 130' located in the central region M and having the same linear grating pattern and is output inclined downward at the predetermined exit angle θ with respect to one surface of the light guide unit 110, is larger than the region which is occupied by the light L4a that is diffracted by the output diffractive optical element 23 disposed on the upper side in the diffractive light guide plate 20 described above and is output inclined downward at the predetermined exit angle θ with respect to one surface of the light guide unit 21.

Furthermore, the region, which is occupied by the light L4b' that is diffracted by the output diffractive optical element 140 disposed on the lower side and the output diffractive optical element 140' located in the central region M and having the same linear grating pattern and is output inclined upward at the predetermined exit angle θ' with respect to one surface of the light guide unit 110, is larger than the region which is occupied by the light L4b that is diffracted by the output diffractive optical element 24 disposed on the lower side in the diffractive light guide plate 20 described above and is output inclined upward at the predetermined exit angle θ' with respect to one surface of the light guide unit 21.

Accordingly, an intersection region I', where the light L4a' diffracted by the output diffractive optical element 130 disposed on the upper side and the output diffractive optical element 130' located in the central region and having the same linear grating pattern and output inclined downward at the predetermined exit angle θ with respect to one surface of the light guide unit 110 intersects the light L4b' diffracted by the output diffractive optical element 140 disposed on the lower side and the output diffractive optical element 140' located in the central region and having the same linear grating pattern and output inclined upward at the predetermined exit angle θ' with respect to one surface of the light guide unit 110, may have a longer length in the vertical direction than the intersection region I where the lights L4a and L4b according to the diffractive light guide plate 20 described above intersect each other.

That is, since it is possible to form the long intersection region I' at a position spaced apart from one surface of the light guide unit 110 by the eye relief, it is advantageous in that it is possible to widely cope with pupils of users with various physical conditions.

Each of the diffractive optical elements 120, 130, and 140 may include linear gratings repeatedly formed at predetermined pitches P1 to P3. Such a linear grating may be in the form of a protruding protrusion.

The diffractive optical elements 120, 130, and 140 may have grating vectors V1 to V3, respectively, which are defined by a 'size' inversely proportional to the pitches P1 to P3 of the linear gratings and a 'direction' perpendicular to a direction in which the linear gratings are extended. The sizes of the grating vectors V1 to V3 may be defined by Equation 1 below.

$$|V| = \frac{2\pi}{P} \qquad \text{Equation 1}$$

In Equation 1 above, |V| denotes the size of the grating vector of the diffractive optical element and P denotes the pitch of the linear gratings of the diffractive optical element.

The sum of the grating vectors V1 to V3 of the input diffractive optical element 120 and the two output diffractive optical elements 130 and 140 is a value of 0.

In such a case, preferably, the grating vectors V1 to V3 of the input diffractive optical element 120 and the two output diffractive optical elements 130 and 140 have the same size to each other and form an angle of 60° therebetween. This is because it is possible to form all of the respective diffractive optical elements 120, 130, and 140 by one mold having grating patterns with the same pitch.

As an embodiment, as illustrated in FIG. 6a, the input diffractive optical element 120 may have linear gratings that form an angle of 90° with respect to a horizontal line H parallel to an x axis. Between the two output diffractive optical elements 130 and 140, the output diffractive optical element 130 located on the upper side in the predetermined region S may have linear gratings that form an angle of −30° with respect to the horizontal line H parallel to the X axis as illustrated in FIG. 6b and the output diffractive optical element 140 located on the lower side in the predetermined region S may have linear gratings that form an angle of +30° with respect to the horizontal line H parallel to the X axis as illustrated in FIG. 6c. Since the pitches P1 to P3 of the respective linear gratings are all the same, the sizes of the grating vectors V1 to V3 of the diffractive optical elements 120, 130, and 140 are all the same. Since the directions of the grating vectors V1 to V3 are perpendicular to the direction in which the respective linear gratings are extended, the direction of the grating vector V1 of the input diffractive optical element 120 may be parallel to the x-axis direction, the direction of the grating vector V2 of the output diffractive optical element 130 located on the upper side in the predetermined region S may form an angle of −120° with respect to the x-axis direction, and the direction of the grating vector V3 of the output diffractive optical element 140 located on the lower side in the predetermined region S may form an angle of +120° with respect to the x-axis direction. As a consequence, the respective grating vectors V1 to V3 of the input diffractive optical element 120 and the two output diffractive optical elements 130 and 140 form an angle of 60° therebetween and the sum of the respective grating vectors V1 to V3 is a value of 0.

Preferably, the two output diffractive optical elements 130 and 140 are provided on the same plane on the light guide unit 110. In an embodiment of the present disclosure, the two output diffractive optical elements 130 and 140 are provided on the one surface 110a of the light guide unit 110. Since the two output diffractive optical elements 130 and 140 are configured not to form regions overlapping each other on the same plane on the light guide unit 110, when the two output diffractive optical elements 130 and 140 are manufactured, one mold is provided with grating patterns capable of forming all the linear gratings of the two output diffractive optical elements 130 and 140, so that it is advantageous in that it is possible to form the linear gratings of the two output diffractive optical elements 130 and 140 at a time.

A display device (not illustrated) according to another aspect of the present disclosure may include a light source (not illustrated) that outputs an image light that forms an image and the diffractive light guide plate 100 according to an aspect of the present disclosure. The image light output from the light source may be input to and diffracted by the input diffractive optical element 120 and coupled to the two output diffractive optical elements 130 and 140. The two output diffractive optical elements 130 and 140 may diffract and extend the coupled and received light in one dimension, and the one-dimensionally extended light may be coupled to the other output diffractive optical elements 140 and 130 and output from the light guide unit 110 by diffraction. The extended image light is output from the light guide unit 110 by each of the two output diffractive optical elements 130 and 140, so that it is advantageous in that it is possible to form an image light having a larger viewing angle as compared with the case of outputting the image light from the light guide unit 110 by using only a single diffractive optical element.

In addition, according to an embodiment of the present disclosure, in the central region having at least a predetermined width within the predetermined region S and partitioned longitudinally from the side S1, which is adjacent to the input diffractive optical element 120, to the opposite side S2, since the two output diffractive optical elements having different linear grating patterns from each other are alternately arranged in at least one dimension, it is possible to form the long intersection region I' at a position spaced apart from one surface of the light guide unit 110 by the eye relief, so that it is advantageous in that it is possible to widely cope with pupils of users with various physical conditions by widely forming a so-called eye motion box.

Figure 10:
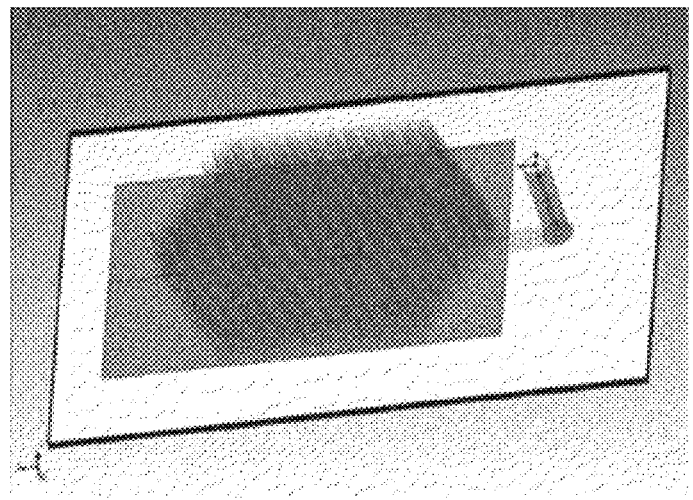
FIG. 10 is a view illustrating a simulation result of lights output from a diffractive light guide plate according to a comparative example of the present disclosure.
Figure 10:
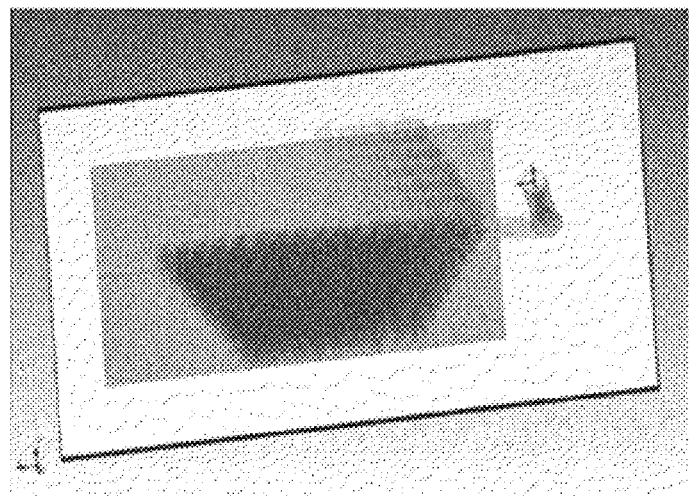
Figure 11:
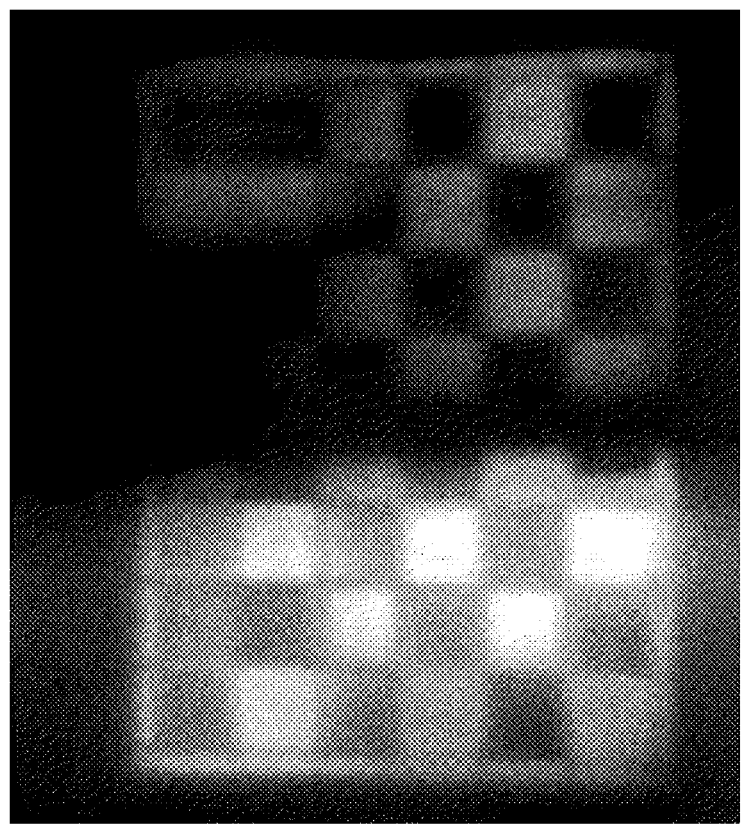
FIG. 11 is a result obtained by capturing an image output by the diffractive light guide plate according to the comparative example of the present disclosure.

FIG. 10 is a view illustrating a simulation result of lights output from a diffractive light guide plate according to a comparative example of the present disclosure, and FIG. 11 is a result obtained by capturing an image output by the diffractive light guide plate according to the comparative example of the present disclosure.

The comparative example illustrates the diffractive light guide plate in which two output diffractive optical elements are separately arranged vertically, but the two output diffractive optical elements are not alternately arranged along the longitudinal direction of a light guide unit.

(a) of FIG. 10 is a result obtained by simulating a path of lights output through the output diffractive optical elements when a light is incident perpendicular to an input diffractive optical element side, and (b) of FIG. 10 is a result obtained by simulating a path of lights output through the output diffractive optical elements when a light is incident with an inclination of 5° to the vertical toward the input diffractive optical element side. The simulation was performed through Virtual Lab software (LightTrans).

When the light is incident perpendicular to the input diffractive optical element side, it can be seen that the lights are output from most regions where the two output diffractive optical elements are disposed. However, when the light is incident with the inclination of 5° to the vertical toward the input diffractive optical element side, it can be seen that no lights are output from a significant portion of an upper region of the two output diffractive optical elements.

Referring to FIG. 11, it can be seen that, as a result of actually capturing an image output through the diffractive optical elements according to the comparative example, the image appears dark in the significant portion of the upper region of the two output diffractive optical elements.

Figure 12:
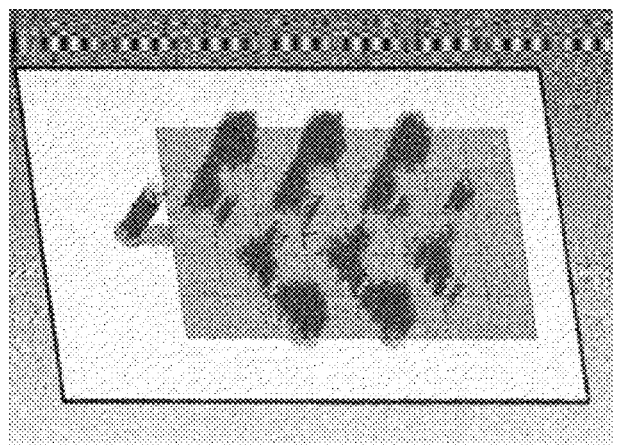
FIG. 12 is a view illustrating a simulation result of lights output from a diffractive light guide plate according to an embodiment of the present disclosure.
Figure 12:
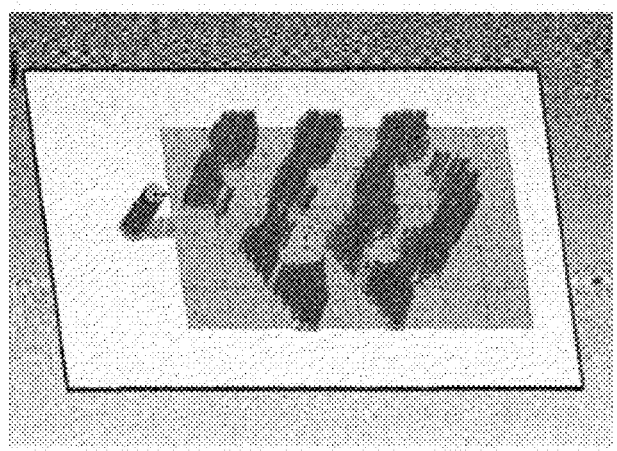

FIG. 12 is a view illustrating a simulation result of lights output from the diffractive light guide plate according to an embodiment of the present disclosure.

The embodiment relates to the diffractive light guide plate in which two output diffractive optical elements are alternately arranged in two dimensions in a predetermined region.

(a) of FIG. 12 is a result obtained by simulating a path of lights output through the output diffractive optical elements when a light is incident perpendicular to an input diffractive optical element side, and (b) of FIG. 12 is a result obtained by simulating a path of lights output through the output diffractive optical elements when a light is incident with an inclination of 5° to the vertical toward the input diffractive optical element side.

In both cases where the light is incident perpendicular to the input diffractive optical element side and where the light is incident with the inclination of 5° to the vertical toward the input diffractive optical element side, it can be seen that the lights are output from most regions where the two output diffractive optical elements are disposed.

Although the present disclosure has been described in relation to the preferred embodiment described above, various corrections or modifications can be made without departing from the subject matter and scope of the disclosure. Therefore, the appended claims will include such corrections or modifications as long as they belong to the subject matter of the present disclosure.

The invention claimed is:

1. A diffractive light guide plate comprising:
a light guide unit configured to guide lights;
an input diffractive optical element configured to receive lights output from a light source and diffract the received lights to be guided on the light guide unit; and
two output diffractive optical elements disposed in a predetermined region of the light guide unit and having different linear grating patterns from each other,
wherein the two output diffractive optical elements are configured so that each one output diffractive optical element receives the lights from the input diffractive optical element and allows the received lights to be directed to the other output diffractive optical element by diffraction,
wherein the two output diffractive optical elements are configured so that each one output diffractive optical element receives lights from the other output diffractive optical element and allows the received lights to be output from the light guide unit by diffraction,
wherein the two output diffractive optical elements having different linear grating patterns from each other are alternately arranged in at least one dimension in a central region having at least a predetermined width within the predetermined region and partitioned longitudinally from a side adjacent to the input diffractive optical element to an opposite side thereto, and
wherein the two output diffractive optical elements are alternately arranged in two dimensions in the central region or all over the predetermined region.

2. The diffractive light guide plate according to claim 1, wherein the two output diffractive optical elements are in contact with each other without forming regions overlapping each other on the light guide unit.

3. The diffractive light guide plate according to claim 1, wherein each of the two output diffractive optical elements has a width of 4 mm or less in the region where the two output diffractive optical elements are alternately arranged.

4. The diffractive light guide plate according to claim 1, wherein each of the two output diffractive optical elements has a length of 4 mm or less in the region where the two output diffractive optical elements are alternately arranged.

5. The diffractive light guide plate according to claim 1, wherein each of the diffractive optical elements includes linear gratings repeatedly formed at predetermined pitches and has a grating vector defined by a size inversely proportional to the pitches of the linear gratings and a direction perpendicular to a direction in which the linear gratings are extended, and
wherein a sum of the grating vectors of the input diffractive optical element and the two output diffractive optical elements is a value of 0.

6. The diffractive light guide plate according to claim 5, wherein the grating vectors of each of the input diffractive optical element and the two output diffractive optical elements have the same size to each other.

7. The diffractive light guide plate according to claim 5, wherein the grating vectors of each of the input diffractive optical element and the two output diffractive optical elements form an angle of 60° therebetween.

8. The diffractive light guide plate according to claim 1, wherein the two output diffractive optical elements are provided on the same plane on the light guide unit.

9. A display device comprising:
   a light source configured to output an image light that forms an image; and
   the diffractive light guide plate according to claim 1.

* * * * *